July 12, 1966     E. F. HOLDEN     3,260,238

AUTOMATIC FISH FEEDER

Filed Dec. 9, 1964

INVENTOR

EDWARD F. HOLDEN

BY *Olsen and Stephenson*

ATTORNEYS

United States Patent Office 3,260,238
Patented July 12, 1966

3,260,238
AUTOMATIC FISH FEEDER
Edward F. Holden, 602 Eberwhite Blvd.,
Ann Arbor, Mich.
Filed Dec. 9, 1964, Ser. No. 417,015
6 Claims. (Cl. 119—5)

This invention relates generally to automatic feeding devices and more particularly to an improved feeding device capable of automatically dispensing predetermined amounts of food to captive fish and other animals in an aquarium or tank over a preselected period of time.

A major problem commonly experienced by aquarists involves the feeding of the captive fish throughout the day as nature intended. Often, too large a quantity of food is fed to the fish at one time, and this over-feeding results in uneaten food which clouds the aquarium water, instigates the growth of fungus or mold, and may tend to give an unpleasant odor. A similar problem arises when it is necessary to leave the aquarium untended over a period of days. Insufficient food is available to the fish during the absence of the aquarist, and as a result, the fish either die or become weakened and thus more prone to disease. It is an object of this invention, therefore, to provide an improved feeding device which can be placed in an aquarium for automatically dispensing predetermined amounts of food to the fish over a prolonged period of time.

Another object of this invention is to provide a simple and inexpensive automatic fish feeder which is capable of use over a prolonged service life.

The feeding device of this invention consists primarily of three elements, namely, a buoyant container, a wick member inserted through an opening in the bottom of the container so that water will slowly seep into the container throughout the feeding period, and food containing troughs which are mounted on the exterior of the container. In use, the desired amount of fish food is placed in the feeding troughs which are spaced at different vertical levels on the container, and the container is floated on the surface of the water in the aquarium. Water in the aquarium slowly seeps through the absorbent wick into the interior of the floating container causing it to gradually descend into the water. When the water level reaches the food at the different levels in the feeding troughs, the food is automatically dispensed into the aquarium water for consumption by the fish. Some of this food may float on the surface of the water until eaten by the fish and some of it may remain in the feeding troughs, but in either case the food is readily accessible to the fish. Little if any of the food falls to the bottom of the aquarium, so as to contaminate the aquarium water, since any food that floats is disposed above the trough from which it originated.

The feeder of this invention is thus usable to feed aquarium fish throughout a one day period with only a single loading of the feeding troughs, and can also be used to feed aquarium fish over a period of several days with but one initial loading of the feeding troughs.

Further objects, features and advantages of this invention will become apparent from a consideration of the following description, the appended claims, and the accompanying drawing in which:

Figure 1:
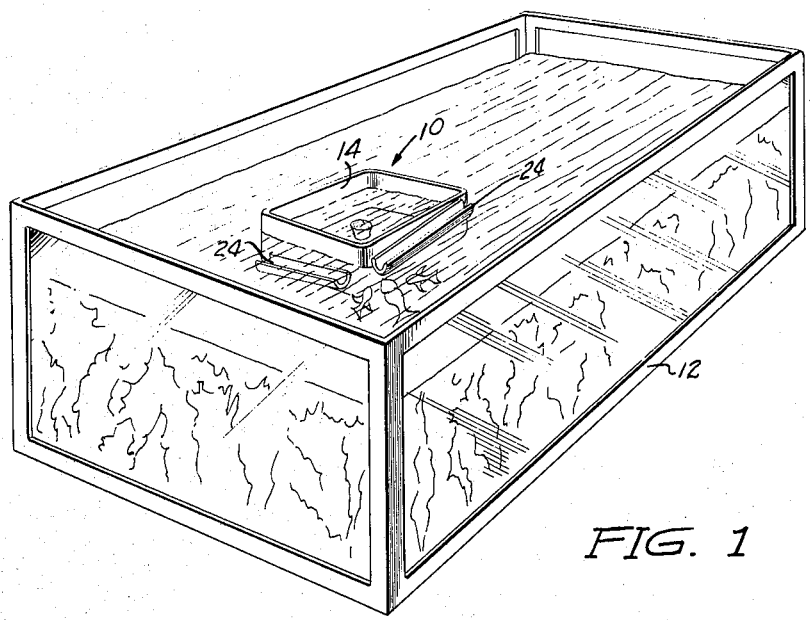
FIGURE 1 is a perspective view of an aquarium showing one form of the feeding device of this invention floating in the aquarium.
Figure 2:
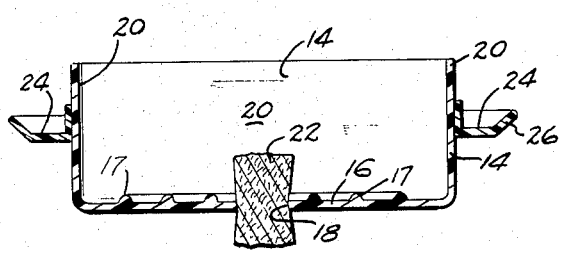
FIGURE 2 is a transverse sectional view of the feeding device of this invention shown in FIG. 1.

With reference to the drawing, one form of the feeding device of this invention, indicated generally at 10, is illustrated in FIG. 1 floating in an aquarium 12. The device 10 includes a container 14 having a bottom wall 16 provided with an opening 18 and formed preferably of a lightweight material such as plastic to improve the buoyancy of the container 14. In the embodiment of the invention illustrated in FIGS. 1 and 2, the container 14 is generally rectangular having four upright side walls 20. A generally cylindrical body 22 formed of absorbent material such as felt, cotton, a foamed plastic material, or the like, which is hereinafter referred to as a "wick," is inserted through the opening 18 in the bottom wall 16 so that it extends into the interior of the container 14. The function of the wick 22 is to provide for a slow seepage of aquarium water into the interior of the container 14 to thereby slowly add to the weight of the container 14 to cause a slow descent of the container 14 in the aquarium 12. A feeding trough 24 is secured to the exterior of one or more of the container walls 20. In the embodiment of the invention illustrated in FIGS. 1 and 2, the troughs 24 are secured to all four of the container walls 20, even though only three of the troughs 24 are illustrated. As shown in FIG. 1, each trough is mounted on a wall 20, so that the trough 24 is slightly inclined relative to a horizontal plane. As a result, longitudinally spaced portions of each trough are at different levels relative to the level of the water in the aquarium 12, and as shown in FIG. 1 different troughs 24 may be at different levels.

In a prferred embodiment of the invention, the container bottom wall 16 is formed with annular lips 17, concentric with water inlet opening 18 to equalize distribution of water in the container in the initial stages of seepage. This arrangement prevents tilting of the container 14. The small height of the container 14 in relation to its width and the flat shape of the bottom side of bottom wall 16 also prevents titlting.

In the use of the feeding device 10 of this invention, the container 14, without any water inside it, is floated on the surface of the aquarium water, with the wick 18 partially submerged. The feeding troughs 24 are then loaded, along their lengths, with amounts of food dependent on the number of fish in the aquarium 12. Water slowly seeps into the container 14 through the wick 18 so that the container 14 slowly descends into the aquarium. As the container descends, progressively increasing amounts of food on the troughs 24 are made available to the fish in the aquarium 12 so that the fish can continually feed. In the embodiment of the invention illustrated in FIGS. 1 and 2, each trough has an upwardly and outwardly inclined lip 26 which facilitates feeding from the side of the trough 24.

Figure 3:
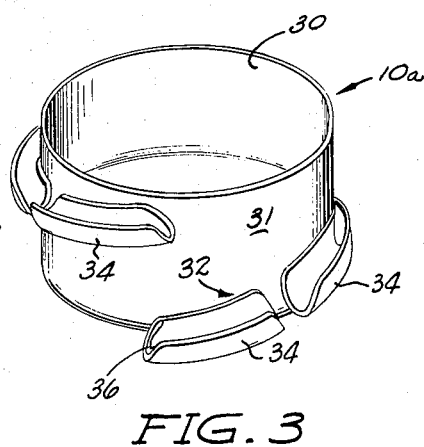
FIGURE 3 is a perspective view of another form of the feeding device of this invention.

In FIG. 3, a modified form 10a of the feeding device of this invention is illustrated. The device 10a is identical in all respects to the feeding device 10 except that in the device 10a the container, indicated at 30, is cylindrical rather than rectangular so that it has a continuous circular side wall 31. Also, the exterior of the container 30 is provided with a trough 32 which extends in a helical path about the external surface of the container side wall 31. The trough 32 may be continuous or it may be formed in the sections 34 illustrated in FIG. 3. In both the devices 10 and 10a, the internal surfaces of the troughs 24 and 32, respectively, may be smooth, rough, or provided with a series of steps which prevent the food from sliding down the troughs prematurely. Also, a lip 36, illustrated in FIG. 3, can be provided at the lower end of a trough to prevent the food thereon from sliding into the aquarium water 12. In a preferred embodiment of the invention, the internal surfaces of the troughs 24 and 32 are sufficiently rough or irregular in shape to prevent the food thereon from sliding prematurely into the aquarium water.

Figure 4:
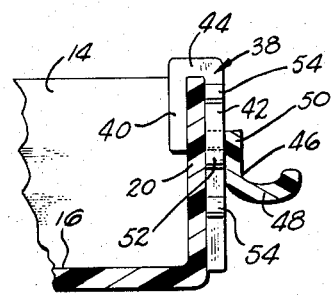
FIGURE 4 is a fragmentary view of still another form of the feeding device of this invention in which a removable trough supporting bracket is mounted on the container, and the trough is adjustably mounted on the bracket.

In FIG. 4, the aquarium wall 20 is shown provided with a removable trough supporting bracket 38. The bracket 38 is of generally inverted U-shape having a pair of legs 40 and 42 which are positioned on opposite sides of the wall 20 and a base 44 which engages the top edge of the wall 20. A feeding trough 46, like the feeding trough 24, is adjustably mounted on the bracket leg 42. In the illustrated embodiment of the invention, the trough 46 has a generally U-shape bottom portion 48 and an upright leg 50 integrally formed with a projection 52 adapted to snap into any one of three vertically spaced sockets 54 provided in the bracket leg 42. By using the brackets 38 to attach the feeding troughs 48 to the container 14, different size troughs 48 may be selected and the troughs may be mounted at desired vertical levels on the container 14.

From the above description it is seen that this invention provides a simple automatic fish feeder 10 or 10a which is capable of automatically dispensing food to fish in an aquarium over prolonged periods of time. Since there are no moving parts in the devices 10 and 10a they are usable without maintenance over prolonged prolonged periods of time. The wick 22 is frictionally supported on the container bottom wall 16 so that it extends through the opening 18 and as a result, the wick can readily be removed for washing to remove algae or other aquarium deposits. Since the containers 14 and 30 float in the aquarium water, they are preferably made of a plastic material slightly lighter in weight than water, namely, having a lower specific gravity than water, so that they will not sink to the bottom of the aquarium at the end of a feeding cycle.

The feeding devices 10 and 10a can be made in different sizes to adapt them to different size aquariums and different size fish. As container 14 or 30 gradually descends into the aquarium water, there is less head between the aquarium water outside the container than there is inside the container, so that the rate of descent of the container decreases as it descends further into the water. Thus, different rates of dispensing of food can be obtained by commencing the feeding cycle at different positions or heights of the container in relation to the surface of the aquarium water.

It will be understood that the automatic fish feeder which is herein disclosed and described is presented for purposes of explanation and illustration and is not intended to indicate limits of the invention, the scope of which is defined by the following claims.

What is claimed is:
1. An automatic fish feeding device comprising a floatable container shaped to contain a liquid, means on said container for admitting water to the interior thereof at a predetermined rate, and feed means mounted on the exterior of said container and adapted to contain fish food.
2. A fish feeding device adapted to be floated on a body of water, said device comprising a floatable container having a bottom wall, means in said bottom wall for admitting water from said body to the interior of said container at a predetermined rate to provide for a descent of said container in said body of water, and a feeding trough mounted on the exterior of said container and inclined with respect to a horizontal plane.
3. A feeding device according to claim 2 in which said container is rectangular, has side walls extending upwardly from said bottom wall and has said troughs attached to said side walls.
4. A feeding device according to claim 2 in which said container has a generally cylindrical side wall and said trough is mounted on the outer side of said side wall so that it follows a substantially helical path.
5. An automatic fish feeding device comprising a container having an interior and an exterior and adapted to be floated in a body of water, said container being formed of a material having a specific gravity less than the specific gravity of water, said container having a bottom wall and an upright side wall, a wick mounted in and extended through said bottom wall for slowly drawing water from said body of water into the interior of said container to provide for a gradual descent of said container into said body of water, and a feeding trough attached to the outer side of said side wall and inclined with respect to a horizontal plane.
6. An automatic feeding device according to claim 5 in which a mounting bracket is removably attached to said side wall for attaching said trough thereto, and coacting means on said trough and said bracket providing for attachment of said trough at different vertical positions to said bracket.

References Cited by the Examiner
UNITED STATES PATENTS

| | | | |
|---|---|---|---|
| 2,711,714 | 6/1955 | Timeus | 119—5 |
| 2,718,211 | 9/1955 | Pettas | 119—51 |
| 2,754,800 | 7/1956 | Gare | 119—5 |
| 2,761,422 | 9/1956 | Martin | 119—5 |

SAMUEL KOREN, *Primary Examiner.*

ALDRICH F. MEDBERY, *Examiner.*